United States Patent [19]
Chen et al.

[11] Patent Number: 5,437,375
[45] Date of Patent: Aug. 1, 1995

[54] DOUBLE-DOCUMENT DETECTION SYSTEMS

[75] Inventors: Zhongtai Chen, West Bloomfield; Ronald G. Shell, Bloomfield Hills; Randy C. Keller, Canton; J. Michael Spall, Plymouth, all of Mich.

[73] Assignee: Unisys Corporation, Blue Bell, Pa.

[21] Appl. No.: 176,368

[22] Filed: Dec. 30, 1993

[51] Int. Cl.6 .......................... B07C 5/00; B65H 7/12
[52] U.S. Cl. .................................. 209/591; 209/722; 271/260; 55/459.5
[58] Field of Search ............... 209/591, 715, 716, 717, 209/719, 722; 271/260, 262, 263; 55/431, 459.1, 459.5; 95/271

[56] References Cited

U.S. PATENT DOCUMENTS

| | | | |
|---|---|---|---|
| 2,992,822 | 7/1961 | Fraibenburgh | 271/260 |
| 3,241,668 | 3/1966 | Schonfeld et al. | 209/591 X |
| 3,516,551 | 6/1970 | Wallen et al. | 55/459.5 X |
| 3,589,714 | 6/1971 | Staples, Jr. et al. | 271/260 |
| 3,773,321 | 11/1973 | Burroughs | 271/260 |
| 4,572,726 | 2/1986 | Van Abbema | 55/431 X |
| 4,853,010 | 8/1989 | Spence et al. | 209/722 X |

Primary Examiner—James R. Bidwell
Assistant Examiner—Tuan N. Nguyen
Attorney, Agent, or Firm—John J. McCormack; Mark T. Starr

[57] ABSTRACT

A method for on-the-fly detection and separation of multiple checks or like documents transported in a track, wherein the documents are first subjected to twin opposed vacuum forces from a suction source, to separate multiple documents; then a measuring and analysis of the resulting pressure differentials is taken within the vacuum-forming system; the system being provided with a cyclonic filter-separator upstream of the suction source, for removing and storing dust and debris entrained within the vacuum-forming air flow; the cyclonic filter-separator being designed to provide constant vacuum-forming airflow regardless of the nature or quantity of debris removed and collected; the system also being provided with a pressure sensor to give clear indication of the separated/unseparated state of the passing documents, and to exhibit a variable damping accessory.

7 Claims, 5 Drawing Sheets

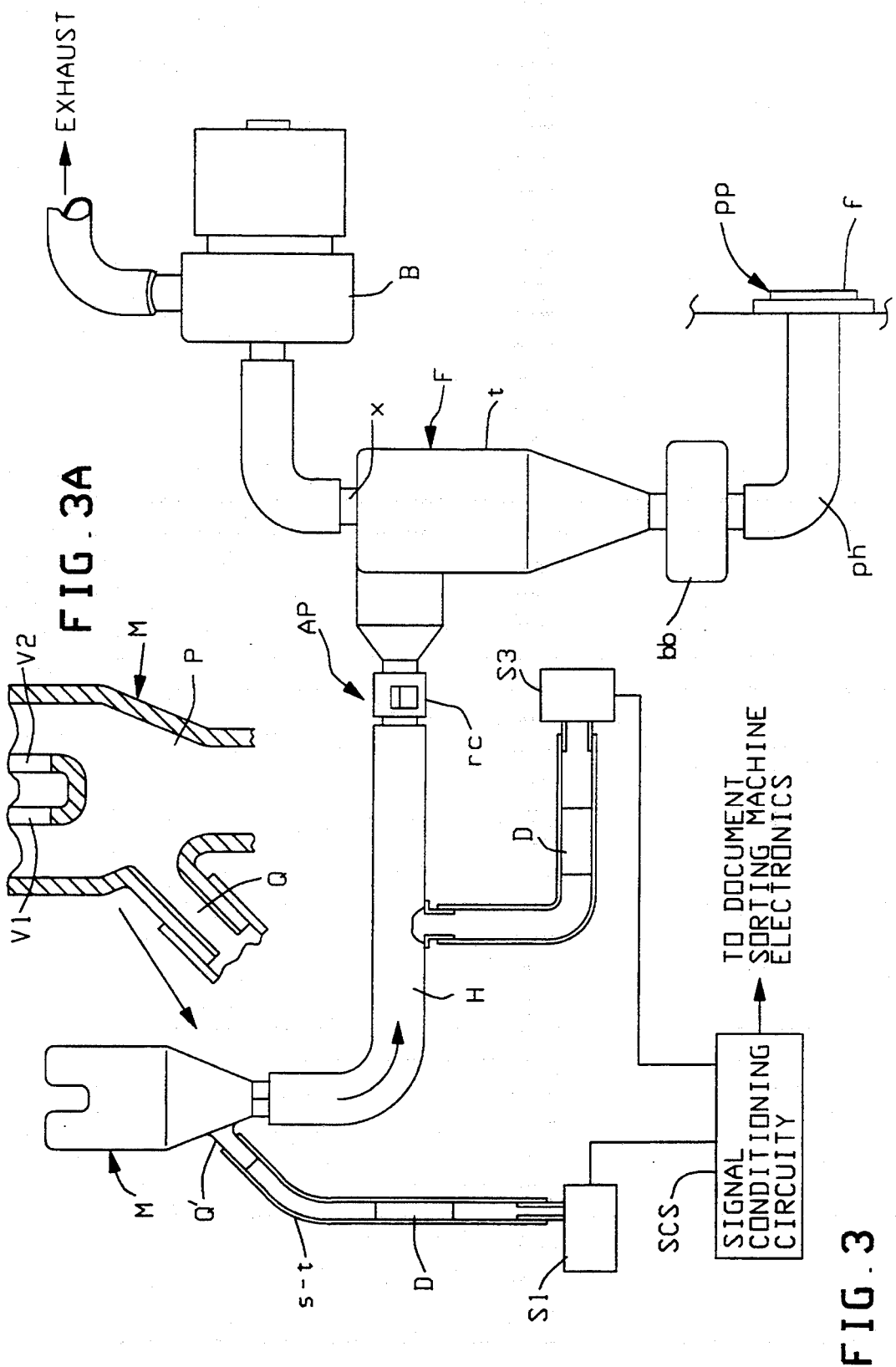

DOUBLE-DOCUMENT DETECTION SYSTEMS

RELATED APPLICATION

Note is taken of our copending related U.S. Ser. No. 08/197,420, filed 15 Feb. 1994 and assigned in common.

FIELD OF INVENTION

This invention relates to double-document detection systems, and particularly to those using a vacuum-separation method to identify and signal "double documents" and employing associated vacuum generating, coupling and sensing means. Particular attention is given to the use of such systems in high-speed document processing machinery.

BACKGROUND, FEATURES

Workers in the field of high-speed document processing, such as in the sorting of bank checks and like financial instruments, know that the art requires the use of machines and systems capable of moving and processing very large volumes of documents at rates of thousands of documents per minute, while performing multiple and interrelated operations upon each document as it travels through such machinery. Such operations might include, but are not limited to, printing upon the documents, reading data previously encoded thereon by a variety of processes, recording an archival image of the document by photographic or electronic-imaging techniques, and other processes and manipulations.

Workers understand that, while processing such large volumes of documents, it is vital that each individual document must be transported and processed singly, and that documents must remain in the order and sequence in which they were processed by the machine. To attain the rates of document processing required, the documents are fed and separated from each other by machinery, which is extensively designed and engineered to ensure that documents are fed one at a time with a very high degree of reliability. Should two or more documents be accidentally fed (a "double", or other "multiple") and processed together, extensive manual effort and time are required to track down the error created among the many thousands of documents which the machine must quickly process. For this reason, the most extreme measures are taken to ensure that the document feeding/separating stage always feeds documents one at a time, no matter what the condition of the documents.

There are still occasional unavoidable circumstances where the machinery will feed more than one document at a time. Examples might include documents which are stapled or glued together, documents which adhere because of ink or other surface treatments, or documents which are attached to one another by mutual tears or folds. Such cases are known in the art as "double-documents" or simply "doubles" or "multiples". The human operators of such sorting and processing machinery are aware that "doubles" are a costly and time-consuming event, and guard against them, the sheer volume of documents fed means that a "double" will occur in the machine from time to time.

For this reason, we find that machinery itself must contain a reliable device for detecting "doubles" as soon as possible after they have been fed, and preferably before any processing has been performed upon them. In this way, the operator may be warned of the presence of a "double" so it will cause minimal disruption to the normal flow of work. Such is a general object here.

Workers in the past have attempted many different techniques for reliably sensing and reporting a double-document. Such techniques must take account of the widely varying characteristics of the documents being fed (as regards thickness, density, opacity, etc.) as well as the increasing document transport speeds which are the result of continuing efforts to increase the processing rate. Techniques which have been tried in the past include:

—optical sensing: By shining a beam of light through the document and measuring how much of the beam passes through to impinge on a sensor, the additional thickness of a second document should produce a measurable change in signal.

This technique, while practical in principle, performs poorly in service. The wide range in characteristics of the documents being fed (especially as regards opacity and thickness) renders such a technique difficult to implement practically. Because such a system must tend to operate in a "fail-safe" mode, it seems to necessarily result in a high rate of "false reports" (of "doubles"). Such a false report is almost as disruptive as a real "double" would be.

Additionally, optical sensors are very susceptible to failure when encountering the high levels of dust and debris usually found in document processing machinery.

—Mechanical sensing: By passing the document between a known reference point and some moving effector, such as a stylus or roller, the thickness of the document may be measured, using various sensors. The additional thickness of a second document should be measurable.

Once again, the wide range of characteristics of the documents to be fed make this an impractical system. The thickest documents may well be more than twice the thickness of the thinnest, causing a high rate of "false double" signals. Additionally, the sensors required to detect mechanical variations of this order are sensitive and costly, and require skilled and time-consuming calibration to give a reliable result.

—Electronic sensing, relying on the variation of a parameter such as reluctance or permeability to detect the presence of documents.

Again, the range of document characteristics make these techniques less than successful; also they require the use of costly, custom-made sensing elements.

We have developed a technique which avoids the foregoin approaches, and gives high reliability, regardless of the nature or condition of the documents being fed; namely, a vacuum-separating and sensing system, and one which is apt for high-speed document processor/sorters. This invention seeks to teach improvements in such a system to enhance its reliability, serviceability and whole-life cost.

CONTEXT OF SYSTEM OPERATION

Some basic principles of our vacuum-separation and sensing approach are shown in FIG. 1. It will be understood that, here, the documents d to be sensed are transported in a vertical position by transport means such as belts, pulleys and the like (not shown, but well understood in the art). The documents d are constrained to pass through a vacuum-separation manifold M which occludes the lower longitudinal edge of the document as it passes.

This manifold incorporates two vacuum ports V1 and V2, disposed one on each side of the document. The two ports are connected to a common plenum chamber P, which is kept at negative pressure relative to the surrounding atmosphere by vacuum blower means B, connected to plenum P by rigid hose means H. (Sufficient suction to separate documents.)

Coupled to manifold M, via a sensing-port Q provided in the wall of hose means H (FIG. 2), is a differential pressure switch S1 which compares the pressure within the hose to the ambient atmospheric pressure.

When no document is present, both vacuum ports V1 and V2 are open and unobscured, and air may freely flow into them under the influence of blower means B. The differential pressure between the inside of hose H and the surrounding atmosphere is "Low".

When a single document is present in manifold M, it will be pulled towards one or other of the two vacuum ports V1–V2 by the suction applied by the action of blower B, and it will tend to close off whichever of the ports it is drawn-to first. The other port will remain open and unobstructed. The document will cause some reduction in the airflow through ports V and there will be a "Moderate" pressure differential between the inside of hose H and the surrounding atmosphere.

When two (or more) documents are present side-by-side in manifold M, they (the outer documents) will tend to be separated, and each will tend to be drawn to an adjacent vacuum port V. When one port is closed and blocked by a document, the suction at the other port will be increased by virtue of the restriction of the airflow, and it will tend to draw the second document towards it even more strongly. When both ports are thus closed and blocked, airflow is reduced to almost nil in a very short period of time, and the differential pressure between the inside of hose H and the surrounding atmosphere will very quickly rise to the "Highest" level of vacuum (which blower B is capable of sustaining).

It will thus be seen that, by monitoring the vacuum-airflow, or the pressure differential between the inside of hose H and the surrounding atmosphere, an indication of the presence of more than one document in manifold M may be obtained which is more or less independent of any physical characteristic of the documents (such as opacity, thickness, color and so on) and is also independent of the number of documents present. By selecting a threshold of pressure differential for switch S1 which corresponds to "both ports V covered", one may determine a condition which may be described as "more than one document" ("multiples") regardless of the actual number of documents involved and regardless of their individual characteristics.

The action of switch S1 is converted to an electrical signal, which is processed by signal-conditioning circuitry (not shown, but familiar to workers in the art) and provides, to the controlling systems of the check-sorting machine, an indication that a "double" (or multiple) has been detected. The controlling systems then direct the suspected "double" to a holding area (e.g., Reject Pocket) of the machine, without further processing, and alert the machine operator, who may investigate the item manually, to correct or otherwise resolve the "double".

Preferably, the documents are transported by belts or the like that engage them along their elongate midsection, while the vacuum ports pull at their lower portions as they pass manifold M (e.g., see FIG. 1A, ports V1, V2). Thus, when a "double" passes M, each document has its lower section "peeled-away" from the other, "on-the-fly", as the belts drive it past parts $V_1$, $V_2$—this being vacuumatically-detected, and signalled to the processor—, with the documents rejoining one another once they pass manifold M. The processor now identifies this "double-document", or "pocket" as such, and can then cause it to be shunted to a Reject-pocket down the line [and if this "reject-pocket" comprises a third, etc. document, all three, etc. documents will be so rejected together, as a "packet"]. And a machine operator will presumably gather-up the contents of such a Reject-pocket and dispose of it (e.g., re-run all such "doubles" singly).

The foregoing might have been adequate (for separating "doubles") in the past, but significant progress has been made in the design and development of check sorting machines. Document speeds and feed rates have increased by orders of magnitude, and the types and qualities of documents to be fed and processed have expanded widely. Additionally, the expectations of systems-users have altered radically, especially in regard to convenience of operation, cleanliness and hygiene, and safety. Modifications have to be made to the components of the system to meet these needs. Among these now-challenging conditions are the following:

—Document speed:

Increasing document speeds have reduced the time available for a "doubles-detect" system to operate on the passing document and determine whether or not it is double. As an example, the Unisys DP1800 check sorting machine operates at a nominal track speed of 300 inches per second (ips) (7.62 meters per second), and may operate with documents having a minimum length of 4.5 inches (11.4 centimeters). For such a document, the time available for the system to operate on the document is 4.5/300 seconds, or about 15 milliseconds. Projected developments may increase document speed to as much as 400 ips (10.1 meters per second), with a corresponding reduction in the time available to the sensor to make its determination. To allow the system to operate adequately within these reducing time periods, larger and more powerful blowers (B) have to be employed. The blower used in the DP1800 product, for example, is rated to flow?? cubic feet of air per minutes and provide a maximum vacuum of ?? inches water gauge. These high airflows and vacuums are required to ensure that the "double" is separated within the manifold M as quickly and securely as possible, even when the documents consist of heavier paper stock with higher resistance to the "bending" of the document required.

—Debris, dust:

Increasing document speeds and a wider range of document types has led to a great increase in the amount of dust and debris which is generated inside check processing apparatus. This material may consist of paper fragments and dust, generated by the friction of the driving elements of the machinery or given off from the cut and sheared edges of the paper itself, as well as rubber and plastic particles shed from the driving elements of the machinery (rolls, belts and the like, as well understood by workers in the art). This material is naturally drawn into the manifold M of the doubles-detect system under the action of the vacuum generated by blower B, and it may collect within the system. There, it may clog pipes and hoses, such as the connection to the pressure switch S1, or build up inside the blower B to the point where the performance is degraded, requiring extensive maintenance and reducing availability to the customer. Finally, such material will be mostly ejected from the system in the exhaust of blower B and into the surrounding atmosphere, where it creates an unsightly and-unhealthy environment for operators of the machinery. It also constitutes a fire hazard if allowed to accumulate, both inside the machine and in the surrounding environment.

—Brief vacuum pulse:

Increasing speeds, and the resulting need for increasing vacuums, have also led to subtle changes in the way that the system functions and provides sensing output, the changes in pressure detected by the pressure switch S1 have become less of a mass-air-flow phenomenon (as they were at lower speeds and lower airflows) and more of a "pulse" phenomenon. When document speeds were slower, pressures would rise and fall (in response to the rates of vacuum ports V) relatively slowly and evenly throughout the system. With much higher speeds and airflows, and much shorter transitions at vacuum ports V, changes in pressure now move through the system as a "pulse" of reduced pressure (vacuum pulse) entrained in a high-speed column of air moving through the system. While this is not a problem in and of itself, (since the pressure switch S1 can still detect and respond to such "pulses" in the same way as if they were a more general reduction in pressure throughout the entire system), additional precautions have to be taken to prevent spurious pulses of changing pressure from being generated in the system and producing false results at the pressure switch. To this end, sensing port Q can be moved further down hose H from manifold M, to provide an effective column of air within hose H between manifold M and sensing port Q. The mass and volume of this column act as a dynamic damper for pressure variations travelling along it, and act to attenuate the magnitude of such pulses as they travel from manifold M to sensing port Q. In this way, the impact of such pulses at pressure switch S1 may be reduced, but not entirely eliminated.

—Spurious pulses:

Similar problems of pulses of changing pressure are also caused by the documents themselves as they travel through manifold M. As document speeds have increased, aerodynamic effects on the documents as they are driven through ambient air become more and more significant. The leading edge of a document being driven at high speeds of current machines may "hunt" from side to side, and the entire document may assume any one of various conditions, such as an undulation from side to side along its length, or a tendency to travel at an angle to the direction it is being driven in. These conditions may in turn lead to unexpected results in the manifold M, where a single document may rapidly obscure first one vacuum port V and then the other, setting up a series of high-frequency pulses in the airflow. Manifold M and the various hoses connecting it to blower B and pressure switch S1 must be carefully designed and tested to ensure that such pressure pulses do not cause spurious signals, and more stringent measures must be taken to selectively damp the airflow to better filter out, and negate, such pressure pulses. Such is an object here.

The foregoing technology can be aptly applied to check-sorting machinery, to address some or all of these concerns, as shown in FIG. 2. The system is, here, altered by the addition of a mechanical air filter F in hose H, and provision for adjusting the airflow through hose H as been made by the addition of a variable orifice R at the entrance to air filter F. The air filter serves to separate the dust and debris from the air stream before it enters blower B, and therefore to prevent it from being expelled into the surrounding environment. Variable orifice R, allows the air flow (and therefore the system differential pressures) to be calibrated to a known standard, which is typically measured by applying a vacuum gauge (not shown, but well known in the art) to a test port T provided in the body of the air filter housing.

While these measures address the identified system problems, they bring problems of their own, and generate new system problems also. The air filter, for instance, can become clogged with dust and debris, thus tending to form a restriction in the airflow and altering the differential pressures within the system. As this restriction is increased by the buildup of debris, the system would tend to miss doubles, since the vacuum at manifold M would be reduced,—thus, a system should be added to warn the operator of excessive buildup of material in the filter. (e.g. a pressure switch S2 which measures the differential pressure across the two faces of the filter and warns the operator when it reached a predetermined level, indicating that the filter was excessively clogged). As document speeds increase, the service period for filter elements will decrease in proportion, until, in some systems, these filters will need to be replaced frequently in order to maintain consistent system performance.

Variations in filter elements will make it necessary to check and adjust system pressures every time a filter has changed; thus a variable orifice R is preferably added so one can selectively adjust system pressures to a known standard. This practice, while improving system performance and maximizing filter service time will add considerably to the cost of the system.

All these conditions can combine to produce a set of system requirements which are increasingly more stringent. Since air flow rates are now far higher, the system must be designed with a minimum of restrictions which might reduce air flow or produce undesired pressure effects. Variations in airflow (and therefore pressure) must be kept to a minimum over the long term, to maximize the thresholds defining a "double" and to minimize the occurrance of false signals. And the system must accommodate a large and continuous supply of dirt and debris without impact upon its function and (preferably) without ejecting such material into the customer's environment.

This invention addresses these and related problems by teaching an improved separator system wherein the vacuum manifold and sensing means are integrated into a single stabler unit having minimal and controlled variability, while the supporting systems are so designed as to provide optimum airflow over long periods with minimal maintenance. The preferred arrangement also includes a function whereby dirt and debris are automatically extracted from the airflow as a function of its operation, but without impact upon its normal operation, and means whereby such foreign matter may be accumulated over long periods and purged from the system with little or no impact upon its normal operation.

The methods and means discussed herein will be generally understood as constructed and operating as presently known in the art, except where otherwise specified; and with all materials, methods, devices and apparatus herein understood as being implemented by known expedients according to present good practice.

BRIEF DESCRIPTION OF THE DRAWINGS

These and other features of the present invention will be appreciated by workers as they become better understood by reference to the following detailed descriptions of past and present preferred embodiments which should be considered in conjunction with the accompanying drawings, wherein like reference symbols denote like elements.

FIG. 3 is a schematic of a preferred embodiment of the present invention, and details features of advantage which address shortcomings of the systems in FIGS. 1 and 2, with FIG. 3A showing a portion in section.

GENERAL CONCEPT OF PREFERRED EMBODIMENT

In the foregoing some basic concepts for vacuum-separation doubles-detect/separation was discussed, with particular reference to the problems which accompany the use of such a system for check processing, difficulties found as system parameters have become more demanding.

This embodiment will address these various shortcomings, in general, as follows:

It employs a system for filtering the air to remove entrained dust and debris which would not change the airflow or differential pressures of the system regardless of the amount of such debris removed or the length of time the system was operated. Such a separation system would preferentially collect the removed debris in such a manner as to be easily purged from the system with minimal intervention by service personnel.

It will be constructed so that the pressure switch used to record the changes in pressure caused by "double" will be (so far as possible) immune to transient pressure pulses and to like effects associated with the high-speed transport of documents.

It will provised for engineered, variable damping of the response of the pressure switch to allow the system to be tuned to provide the most reliable response possible under varying document and system conditions.

DESCRIPTION OF PREFERRED EMBODIMENT (FIGS. 3–5)

The preferred embodiment of the present invention is shown semi-schematically in FIG. 3, with FIG. 3A showing manifold parts enlarged and in section.

The vacuum separation of documents, and the pressure effects produced by different combinations of documents, remain unchanged from that previously described, and the configuration of vacuum ports V and manifold M immediately surrounding them is as previously described. However, in contrast to FIGS. 1, 2, the vacuum manifold M in the area of plenum P has been designed to incorporate a sensing port Q within plenum P (pneumatically coupled directly thereto), as close as possible to the two vacuum ports V, but sufficiently far that the pressure changes experienced at the port, are the result of the combined influence of both ports and are not influenced at any given time by the pressure within one port more than by the pressure within the other. In this manner, changes in plenum pressure, corresponding to different combinations of documents, may be imparted to pressure switch S1 as quickly and directly as possible, and without the intervention of the long air-flow passage of hose H as in FIGS. 1, 2.

Figure 1:
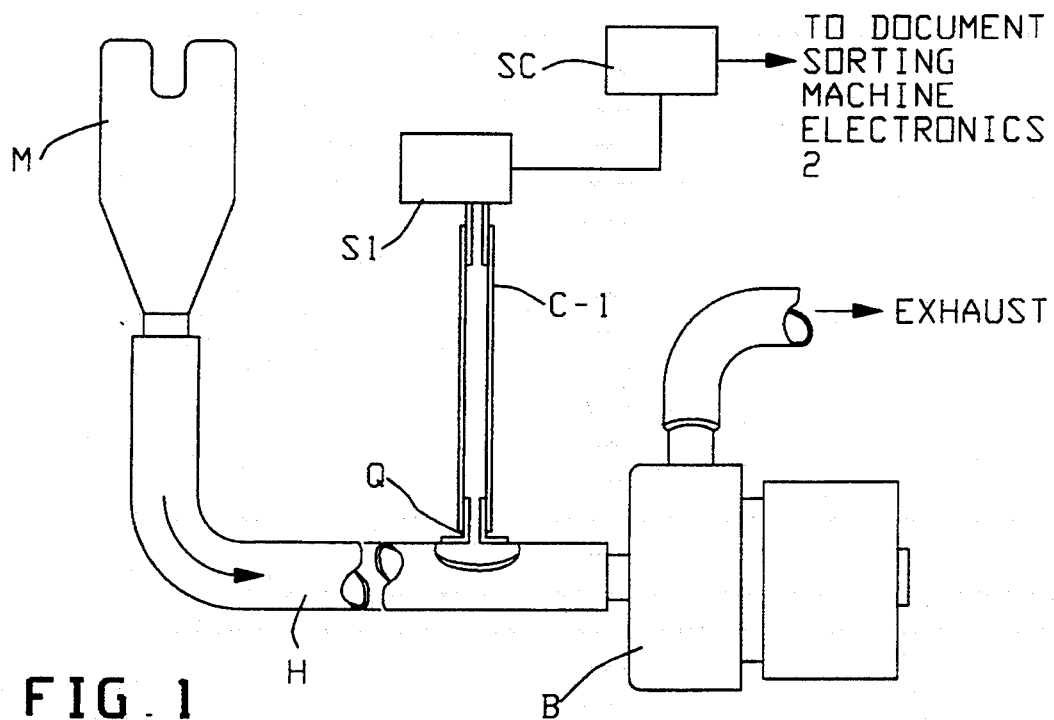
FIG. 1 is a schematic view showing principles of a "basic" vacuum-separation "doubles-detect" system as previously described, with FIG. 1A showing a portion in section.
Figure 1A:
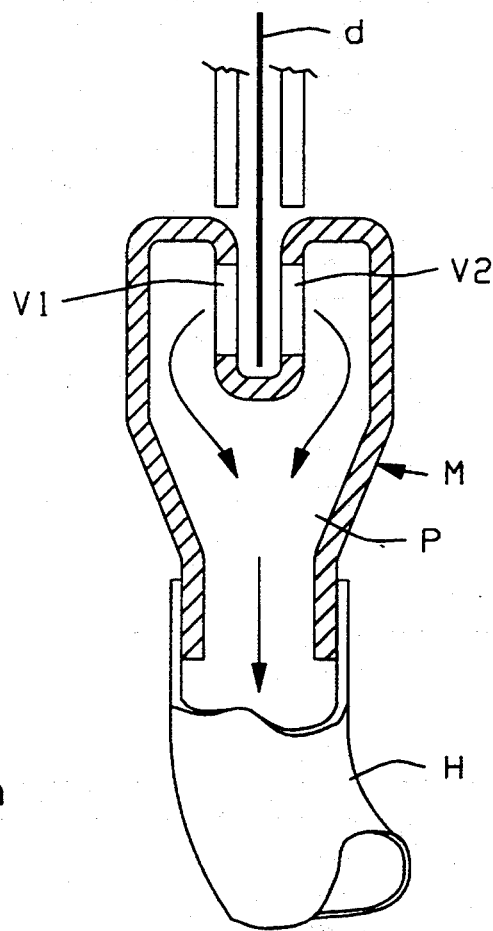
Figure 2:
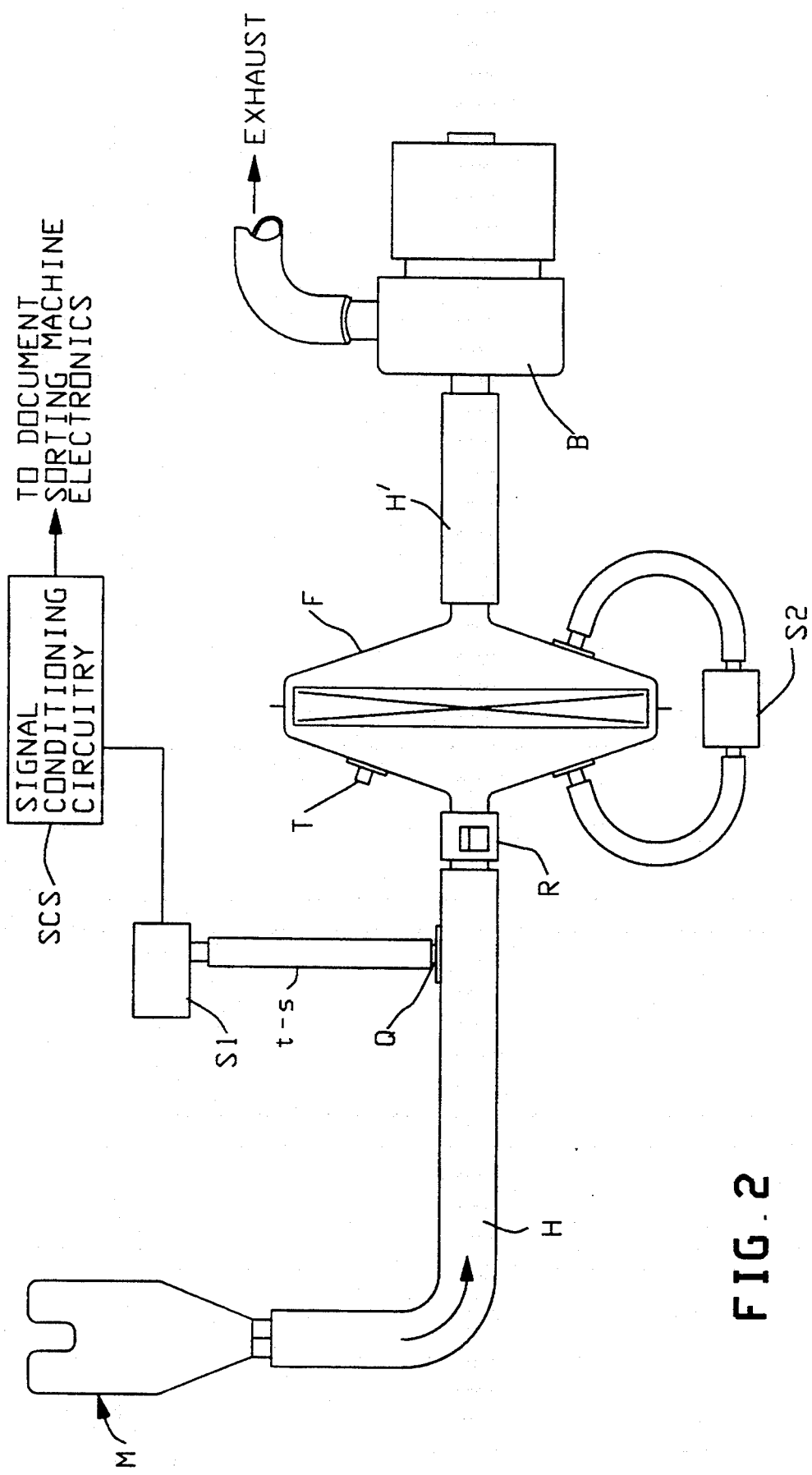
FIG. 2 is a schematic view showing how the basic system of FIG. 1 can be modified to include some features which attempt to address problems (better addressed by the present preferred embodiment as in FIGS. 3–5)

In FIGS. 1, 2 the length of hose H between plenum P and sensing port Q was visualized as for suction-flow, as well as for an air-column damper to absorb the effects of undesired pressure pulses as previously described. This application was prone to variation and error due to variations in the manufacture and assembly of hose H and possible changes in its configuration once in the field. A twist or kink, imparted by a careless technician, could radically alter this damping effect and change system performance.

Accordingly, as a feature of advantage, we have removed this air-column-damping effect by moving sensing port Q as close as practical to plenum P, as described, and coupled the sensing-tube s-t directly to plenum P, and not via suction-flow hose H. Further, we have also provided engineered and stable damping by adding air flow damping means D within the connection (sensing tube s-t) between plenum P and switch S1. In our preferred embodiment, this damping means consists of a circular rod (piston D) made from an inert, particulate metallic material, to yield known and stable permeability to air. Piston D serves to damp-out noise pulses (brief high-vacuum pulses), in the air passing through it. The density and centered particle size of this material, as well as its length, may be varied to provide altered, yet consistent, damping characteristics to optimize the system for changed parameters, without the need to reengineer other parts of the system.

As a further feature of advantage, the signal-conditioning electronics which process the signal from pressure switch S1, are additionally designed to provide a variable "latch" feature which further reduces the number of false doubles signals which the sensor may generate. This "latch" feature (not shown, but well understood in the art) operates so as to send a "double" signal to the system electronics only after the pressure switch has continuously indicated a "double-pressure" condition for a predetermined period of time. In this way, system "noise" generated by brief, high vacuum pulses (which sould be attenuated by damping means D but might in an extreme case be sufficient to activate switch S1), may be effectively filtered out. In our preferred embodiment, the "holding" time is the order of 6.0 milliseconds,—a time corresponding to passage of approximately one third of a minimum-length document at a nominal velocity. We have found six ms. long enough to filter out virtually all false signals caused by highly transient vacuum pulses, while still being brief enough to ensure that all "doubles" are "seen" by the system.

Figure 4C:
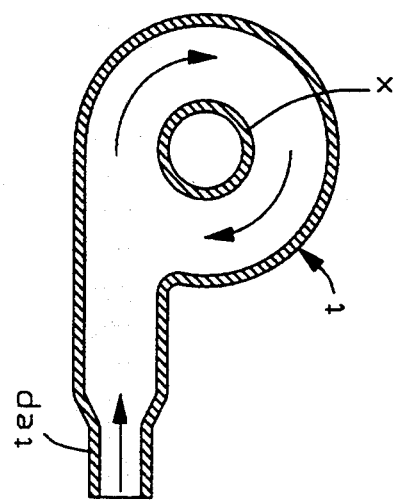
FIG. 4A shows a general arrangement and a detailed sectional view of the construction of a "cyclone" filter and separation system as employed in the preferred embodiment, with FIG. 4B showing a vertical section and FIG. 4C showing a partial horizontal section.
Figure 4B:
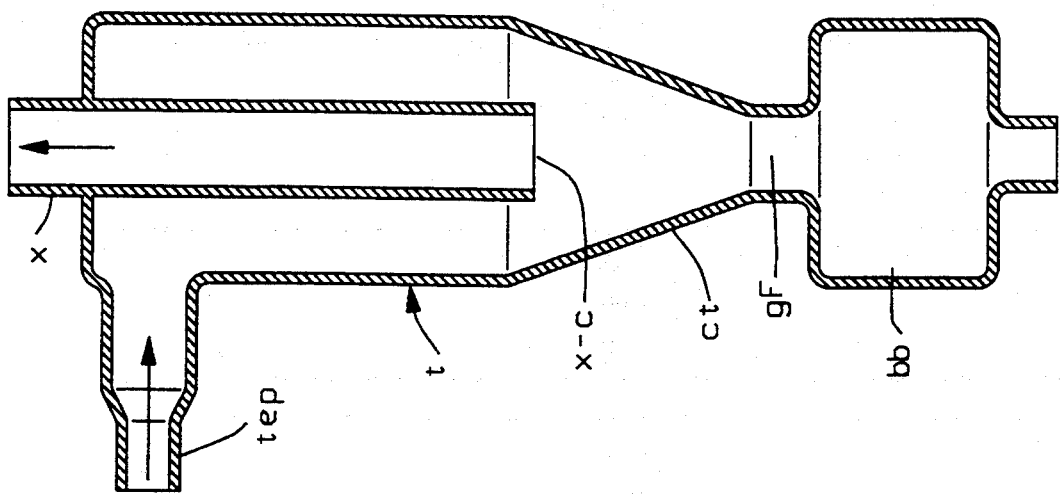
Figure 4A:
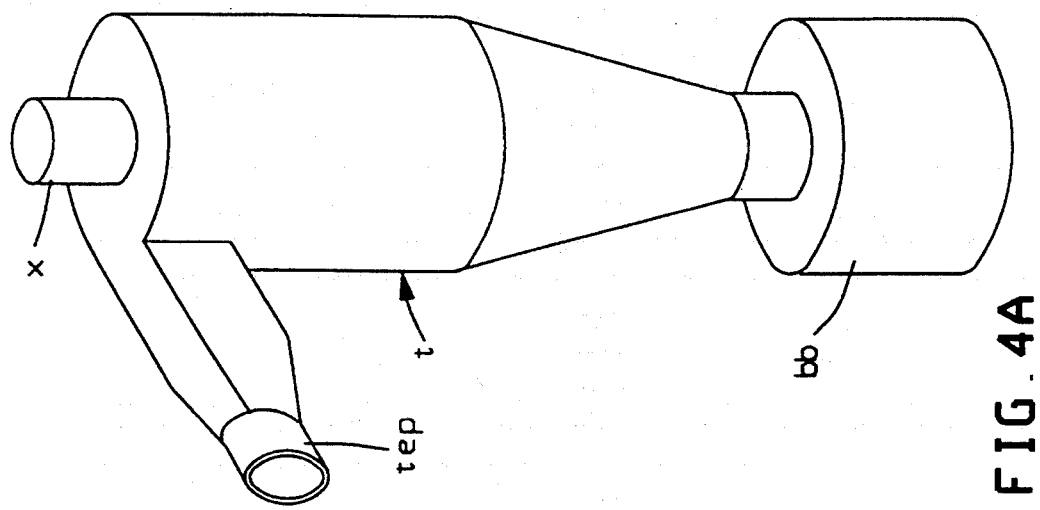

Air passing from manifold M and plenum P then enters cyclone filter system C, which is more completely shown in FIG. 4 and described below. Cyclone filter C consists of a vertical cylindrical tube t, closed at its upper end except for a vertical exhaust port x which extends down through the closed top face of tube t, as shown. The lower end of tube t is conically tapered down to an exit port q, in closed bottom face, below which is disposed a closed cylindrical bunker cavity b, coupled via exit port q. A purging hose ph is connected to bunker b and is terminated at its outer end by a normally-closed purge port pp, which incorporates a self-sealing manually-operable flap FL. (See FIG. 3.)

Incoming air enters cyclone filter vessel F by means of tangential entry port tep (FIGS. 4) which is fashioned in the upper closed end of vessel F and constrains the incoming air to enter the filter in a direction tangential to the circular inside wall of cylinder F. Since the only means of "escape" (egress to blower B) is via the open lower open end xe of exhaust port x (FIG. 4B) the air will commence to spiral down in a circular, helical flow down the inside wall of tube t. As the air travels downwards, it encounters the conically-tapered section of the lower end t1 of tube t,—this increases the air velocity, while at the same time leads it closer to the open end xe of exhaust port x,—the airflow turning upward theretoward. This combined sudden increase in air velocity and sudden change in direction, serves to inertially and centrifugally separate any entrained dust and debris particles in the air, which are driven against the conically tapered lower wall of tube t, and move down the wall (under momentum, and gravity), until they enter exit port q and pass into bunker cavity b.

Various kinds of cyclonic filters can be used in other applications, as workers know, such as in the mining and food-processing industries, where such devices can be used to filter out and separate particulate matter from air streams. Their use and design has been described and analyzed in the literature, e.g., Stairmand (1951), Jackson (1963), Swift (1969), Leith & Licht (1972), Leith (1979), Dietz (1981), et al. Such cyclones are often referred to in the art as "Stairmand" cyclones, after the first author to exhaustively analyze their function and design.

Figure 5:
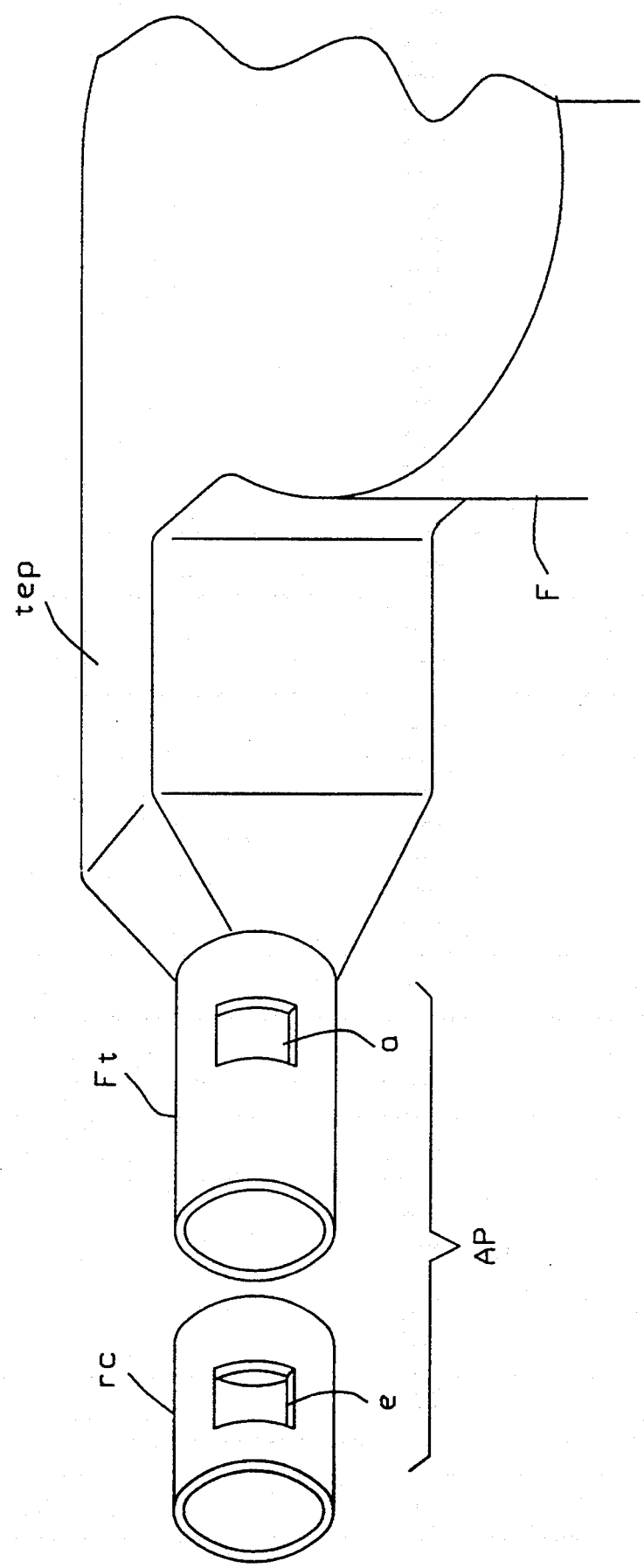
FIG. 5 shows a detail of the construction of a "variable aperture" which preferably forms part of the cyclone filter shown in FIG. 4 and described in the text.

The incoming portion of tangential entry port tep is preferably provided (FIG. 5) with a variable aperture array AP which permits the entry of outside air and provides for a pressure-adjustment for the negative pressure in hose H, in plenum P and in manifold M (at vacuum ports V). The construction of this variable aperture is shown in detail in FIG. 5. It consists of an aperture a provided in the open end of tube t-e leading to tangential entry port tep plus a cylindrical rotatable collar rc which fits closely on the outside of said tube t-e (about port tep) and is provided with a second similar aperture aa. Rotating collar rc around the outside of tube t-e can register its aperture aa with aperture a, so the net cross-sectional aperture so formed (by the overlap of individual apertures, a, aa) may be infinitely varied from zero to the total area of aperture a. Thus, the system may be adjusted to give a known vacuum level in hose H, plenum P and at vacuum ports V, which is optimally matched to the velocity of the transported documents, the operation of pressure switch S1, damping means D and to any other minor variations in the various components. This adjustment is preferably performed only once, during the assembly of the system, and will thereafter remain unchanged. Once adjusted correctly, the position of collar rc is fixed (e.g., by means of a circumferential clamp, not shown, but well known in the art or the like).

Cylindrical bunker b is preferably provided with a purge hose ph (FIG. 3) which terminates in a purge port pp mounted on the exterior face of the machine in some convenient location. Purge port PP is, in turn, preferably provided with a normally-closed, manually-operable sealing flap FL, preferably fashioned to accept the suction hose of a standard vacuum cleaner. In normal operation, purge port pp is sealed closed and purge hose ph forms a dead air volume which has no impact on operation. When it is desired to remove accumulated debris from bunker b, a vacuum cleaner may be connected to purge port pp, opening sealing flap FL, and the accumulated material sucked out in a matter of seconds. Since this may temporarily alter the pressure differentials within the system, this procedure should preferably be performed at a convenient opportunity while the system is idle. However, this purge process will have no impact upon the subsequent operation of the system, and may be performed at any time, and by untrained personnel, and without the need for subsequent checking or adjustment of the system. Our testing has shown that in an identical system running an identical schedule, where a "base" design (e.g., FIG. 2) incorporating an air filter could require replacement of the filter every 10 working days, this preferred embodiment will operate stably for approximately 100 days before it is felt necessary to empty the bunker.

Exhaust port x of cyclonic filter F is attached to blower mans B as known in the art, and the exhaust from blower B is ejected from the machine at some suitable point.

While the diagrams shown are schematic, it will be well understood by workers in the art that they are intended to show an idealized system; e.g., they and make no reference to pressure drops or variations which may occur in the system. Therefore, consistent with known good practice, such a system is preferably constructed with hose and interconnection means kept as short and straight as possible, and with minimal variations in the diameter and section of such means in order to keep pressure loses and variations to a minimum, consistent with the requirements of integrating such a system into a check-processing machine.

CONCLUSION

While vacuum-separation systems are here seen as particularly advantageous for use in automated high-speed check sorting machines, as described, workers will readily understand that they have utility for other, analogous applications, such as high-speed currency handling, printing, document-processing and like arts, which require a high-speed means for reliably detecting multiple passing documents or like sheet-like items.

In conclusion, it will be understood that the preferred embodiment(s) described herein are only exemplary, and that the invention is capable of many modifications and variations in construction, arrangement and use without departing from the spirit of the claims.

The above examples of possible variations of the present invention are merely illustrative and accordingly, the present invention is to be considered as including all possible modifications and variations coming within the scope of the inventions as defined by the claims appended hereto.

What is claimed is:

1. A method for on-the-fly detection and separation of multiple documents transported in a track restraining and directing means, wherein said documents are first subjected to twin opposed vacuum forces from suction means, to separate multiple documents; then a measuring and analysis of the resulting pressure differentials within the vacuum-forming system is taken; said system being provided with a cyclonic filter-separator upstream of said suction means, for removing and storing dust and debris entrained within the vacuum-forming air flow, said cyclonic filter being so designed and adapted as to provide constant vacuum-forming airflow regardless of the nature or quantity of debris removed and collected as said; and said system being provided with pressure sensing means so constructed and adapted to give clear indication of the separated or unseparated state of said documents, said pressure sensing means being further provided with variable damping means;

with said vacuum forces being applied to the passing documents by means of a single combined vacuum manifold comprising two vacuum ports so constructed and adapted as to impart opposing vacuum forces to both sides of said passing documents or multiple documents; and wherein said single combined vacuum manifold further incorporates a combined plenum, so constructed and adapted to provide equal vacuum force to both said vacuum ports from a single vacuum source, with such plenum being further adapted to provide sense port means for attachment of a pressure sensing means as close as possible to both said vacuum ports.

2. The method of claim 1, wherein the cyclonic filter is further provided with a variable aperture at its input side, said aperture being infinitely adjustable in area from zero to a calculated upper limit, such aperture serving as a provision for admitting outside air into the system and so permitting the exact adjustment of airflows, pressures and vacuums within the system.

3. The method of claim 1, wherein said cyclonic filter is further provided with an enclosed attached bunker means whereby filtered and separated debris may be collected, stored and removed without impact upon the operation of the system.

4. The method of claim 1, where said sense port means and connected pressure sensing means are so constructed and adapted as to incorporate damping means within the connection, said damping means serving to damp the airflow within the connection and suppress undesired fluctuations in said airflows.

5. The method of claim 3, wherein said bunker means is further provided with purging hose means and self-sealing attachment means, whereby accumulated dust and debris may be purged and removed by vacuum from said bunker without disturbing the function of the system.

6. A method for detecting and separating doubled documents passing along a prescribed document track in a document treatment arrangement, this method comprising:

providing a separation-station along said track and providing manifold-plenum means with opposed vacuum-ports at said station adapted to vacuumatically-suck apart doubled-documents on-the-fly;

providing evacuation means to cause the vacuum at said ports and providing coupling means between said ports and said evacuation means;

providing cyclonic filter means upstream of said evacuation means, said filter means comprising tubular vessel means coupled via inlet means to said coupling means, said evacuation means being coupled near a first end to said vessel means via outlet means and bunker means being coupled to said vessel means near the opposite end of said vessel means; said vessel being tapered adjacent said opposite end and said outlet means extending along said vessel means to adjacent said tapered section, said inlet means presenting a port disposed adjacent said first end of said vessel means and adapted to entrain air therethrough to spiral helically about the interior of said vessel means toward said opposite end, and to then turn toward said inlet port so that entrained particulate debris can precipitate onto said opposite end;

wherein said vacuum-separator ports are adapted to pull a portion of doubled documents apart, to block the respective ports, while the documents are being transported past this station; wherein pressure-sensing means is provided and arranged to register this event and indicate its occurrence to an associated central document processor means;

wherein said pressure-sensing means comprises switch means pneumatically coupled directly to said manifold-plenum means so as to be relatively insensitive to brief, spurious mini-pulse changes in pressure; and wherein said switch means is so coupled via a relatively short coupling tube to minimize the effect of said minipulses.

7. The method of claim 6, wherein cyclone-filter means is disposed upstream of said evacuation means and is adapted to remove particulates entrained in the air-flow and store them in bunker means;

wherein said filter means comprises a cylindrical tube, with pneumatic entry means and exit means at the upper end thereof, with a tapered, conical lower end including said bunker means, and with said exit means coupled to said blower means and including open tubular intake-port means projected centrally down the length of said tube to terminate adjacent said lower end where air will exit said tube;

wherein said entry means is adapted to inject air tangentially top spiral-down along the inner surface of said tube and be decelerated at said conical end, where entrained particulate matter may precipitate-out, and the air flow be pulled-upward to enter said tubular intake port means;

wherein said entry means further includes variable-aperture means adapted to selectively supplement the air flow from said manifold-plenum to adjust system evacuation pressure $P_e$ to the character of the documents passing, of said switch means and the balance of the system; and wherein said variable-aperture means includes aperture tube means plus apertured collar means rotatably mounted about said tube means so that the two apertures may be selectively matched or mismatched to produce a selectable net-aperture cross-section.

* * * * *